United States Patent
Krueger (10) Patent No.: US 11,210,640 B2
(45) Date of Patent: Dec. 28, 2021

(54) BLOCKCHAIN FOR ASSET MANAGEMENT

(71) Applicant: THE BOEING COMPANY, Chicago, IL (US)

(72) Inventor: Casey C. Krueger, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 67 days.

(21) Appl. No.: 16/720,828

(22) Filed: Dec. 19, 2019

(65) Prior Publication Data

US 2021/0192470 A1 Jun. 24, 2021

(51) Int. Cl.
*G06Q 10/00* (2012.01)
*H04L 9/32* (2006.01)
*G06Q 10/06* (2012.01)
*G06Q 50/04* (2012.01)

(52) U.S. Cl.
CPC ..... *G06Q 10/20* (2013.01); *G06Q 10/063114* (2013.01); *G06Q 50/04* (2013.01); *H04L 9/3247* (2013.01)

(58) Field of Classification Search
CPC ............ G06Q 10/00–50/00; H04L 1/00–69/00
USPC ............................................... 705/7.11–7.42
See application file for complete search history.

(56) References Cited

U.S. PATENT DOCUMENTS

| | | | |
|---|---|---|---|
| 10,169,937 B1* | 1/2019 | Zwink | G07C 9/257 |
| 2016/0098723 A1* | 4/2016 | Feeney | G06Q 20/065 705/75 |
| 2017/0132620 A1* | 5/2017 | Miller | H04L 9/30 |
| 2017/0213289 A1* | 7/2017 | Doney | G06Q 40/025 |
| 2018/0089758 A1* | 3/2018 | Stradling | G06F 12/1408 |
| 2018/0165585 A1* | 6/2018 | Saxena | G06N 5/041 |
| 2018/0182052 A1* | 6/2018 | Panagos | G06F 21/604 |
| 2018/0211213 A1* | 7/2018 | Vivier | G06Q 10/0838 |
| 2018/0218343 A1* | 8/2018 | Kolb | G06Q 20/405 |
| 2019/0172073 A1* | 6/2019 | Wiig | G06N 20/00 |

(Continued)

FOREIGN PATENT DOCUMENTS

WO WO-2017201489 A1 * 11/2017 ......... G06Q 20/3829

OTHER PUBLICATIONS

Downey, Liang Xi, Frédéric Bauchot, and Jos Röling. "Blockchain for business value: A contract and work flow management to reduce disputes pilot project." IEEE Engineering Management Review 46.4 (2018): 86-93. (Year: 2018).*

(Continued)

*Primary Examiner* — Alan S Miller
(74) *Attorney, Agent, or Firm* — Patterson + Sheridan, LLP (57) ABSTRACT

Aspects of the present disclosure provide a method and apparatus for asset management. Embodiments include receiving a request from a user to initiate management of a new asset. Embodiments include validating the request based on one or more of a characteristic of the user, a location of the asset, funding related to the asset, or a type of the asset. Embodiments include generating a data vault for the asset, wherein the data vault comprises at least an identifier. Embodiments include identifying at least one user that is an authoritative resource associated with the asset and providing the at least one user with the identifier. Embodiments include receiving, from the at least one user, descriptive data related to the asset. Embodiments include providing the descriptive data to a data store for storage in a data store component.

20 Claims, 5 Drawing Sheets

(56) References Cited

U.S. PATENT DOCUMENTS

| | | | |
|---|---|---|---|
| 2019/0229890 A1* | 7/2019 | Brehmer | H04L 9/3242 |
| 2019/0303541 A1* | 10/2019 | Reddy | H04L 9/0643 |
| 2020/0162254 A1* | 5/2020 | Moreno | H04L 9/3239 |

OTHER PUBLICATIONS

Panday, Mr Prem Nath, and Ms Suruchi Panday. "Blockchain Technologies to Create the Next Generation of Digital Supply Chain Networks for MSMEs." Small 10.200: 25-500. (Year: 2018).*

Holste, Bjoern, and Niels Schoeber. "Real-economy applications of blockchain technology." Available at SSRN 3261612 (2018). (Year: 2018).*

* cited by examiner

BLOCKCHAIN FOR ASSET MANAGEMENT

INTRODUCTION

Aspects of the present disclosure relate to management of assets and, more particularly, to using blockchain technology to comprehensively manage all aspects of a supply chain, including manufacture, maintenance, and replacement of parts and other assets.

Management of assets in an organization is often performed using a variety of software applications that have various shortcomings. For example, in many cases, different lifecycle stages of assets may be managed by different applications that are incompatible with one another. For example, manufacturing, maintenance, and supply chain stages may be managed by different applications. Furthermore, these applications may require significant manual oversight in order to accurately track the lifecycle of an asset.

In some cases, conventional techniques for management of assets involve the storage of large amounts of data in a disorganized and/or unsecure manner, making it difficult to track, protect, and verify the status and history of an asset and difficult to distribute or share data among owners of assets and manufacturers. Accordingly, there is a need in the art for improved asset management techniques.

BRIEF SUMMARY

Certain embodiments provide a computer-implemented method for asset management, comprising: receiving, by a management entity, a request from a user of a distributed system to initiate management of a new asset on the distributed system; validating, by the management entity, the request based on one or more of: a characteristic of the user; a location of the asset; funding related to the asset; or a type of the asset; generating, by the management entity, a data vault for the asset within the distributed system, wherein the data vault comprises at least an identifier; identifying, by the management entity, at least one user that is an authoritative resource associated with the asset; providing, by the management entity, the at least one user with the identifier; receiving, by the management entity from the at least one user, descriptive data related to the asset; providing, by the management entity, the descriptive data to a data store for storage in a data store component; and associating, by the management entity, the data store component with the data vault for the asset In some embodiments, the method further includes: receiving, by the management entity, a notification of a lifecycle event related to the asset, wherein the notification comprises the identifier, and wherein the lifecycle event comprises one or more of: a manufacturing event; a maintenance event; or a supply chain event; and generating, by the management entity, an entry in the data vault based on the notification.

In certain embodiments, the notification of the lifecycle event related to the asset comprises sensor data received from the asset.

In some embodiments, the management entity notifies a set of users of the entry in the data vault, wherein the set of users are permissioned users for the data vault.

In particular embodiments, the method further includes: receiving, by the management entity, a work order request from a given user that is related to the asset; validating the work order request based on one or more of: whether the given user has permission to initiate the work order; whether funding for the work order is approved; or whether the work order complies with a regulation related to the asset; and notifying, by the management entity, the at least one user of the work order.

In some embodiments, the method further includes initiating, by the management entity, a smart contract on the distributed system to manage a lifecycle of the work order.

In certain embodiments, the smart contract is configured to: receive updates related to the work order from a set of users that are permissioned users with respect to the asset; and confirm that the work order is completed.

In some embodiments, the method further includes: receiving, by the management entity, a digital signature from the at least one user; verifying, by the management entity, the digital signature; closing, by the management entity, the work order in response to the verifying; generating, by the management entity, an entry in the data vault based on the work order; and notifying, by the management entity, the set of users of the entry in the data vault.

In certain embodiments, the asset comprises one of: an item of equipment; a facility; an individual; or an organization.

Other embodiments provide a system comprising a processor and a non-transitory computer-readable medium comprising instructions that, when executed by the processor, cause the processor to perform the method described above as well as other methods described herein.

Other embodiments provide a non-transitory computer-readable medium comprising instructions that, when executed by a processor of an electronic device, cause the electronic device to perform the method described above as well as other methods described herein.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide techniques for asset lifecycle management.

Techniques described herein provide end-to-end management of assets such as equipment, facilities, employees, and organizations (e.g., manufacturers, suppliers, maintenance organizations, and other types of organizations) through the use of blockchains comprising secure, modification-resistant data vaults and smart contracts. In some embodiments, blockchain technology is used to track and store information related to lifecycle events for assets, such as manufacturing, maintenance, and supply chain events. Some embodiments involve the use of smart contracts executing on a blockchain to guide and verify stages in an asset's lifecycle, such as work orders. Furthermore, certain embodiments involve receiving data from assets, such internet of things (IoT) data captured by sensors associated with assets, and storing the received data in the distributed system.

A blockchain refers to a data store that is a decentralized distributed ledger or record of time-stamped transactions. A blockchain requires minimal structure and is inherently trustworthy due to its secure and modification-resistant properties. Using processing power and computational algorithms, such as smart contracts, to run and manage the blockchain, there are multiple security checks and mathematical functions for securing the network. Security is based on encrypting and decrypting data with randomly generated transaction ID and digital signature keys, hash pointers connecting all blocks in a linked list structure, and computer nodes (computers on the network) continuously running the network updating and distributing the ledger while reaching consensus to verify and validate transactions. Each transaction is time-stamped and recorded on a block. Once verified, an updated ledger with the time-stamped transaction is distributed to all nodes on the network. Once stored on the blockchain, data cannot be modified without involvement of security measures and consensus protocols on the network.

A block in a blockchain stores a hash pointer connecting the block to the previous block, as well as hashes of values associated with transactions. Each block may, for example, be a file. A block may be referred to as a data store component.

Data vaults, which may encompass subsets of a blockchain, store information specific to an asset, a user, a category, or the like, and store digital signature keys associated with users. A data vault may, for example be equivalent to a "wallet" in blockchain terminology. In some embodiments, a data vault for a given asset references blocks on the blockchain that store transactions related to the given asset.

Each given data vault is associated with one or more transaction identifier (ID) keys, which are addresses of the given data vault to which a plurality of users can send transactions to, and may be equivalent to "public keys" in blockchain terminology.

A digital signature key is private to a user, and is used to sign off and send a transaction. This is the first key of an asymmetric cryptographic key paired with a transaction ID key used to transform a message to a readable format. The digital signature key is used as the digital signature for recording who signed off on which transactions, and at what time. The digital signature key is equivalent to a "private key" in blockchain terms.

A smart contract refers to a computer program that executes within a block on a blockchain and computes a certain set of instructions in order to facilitate, verify, and/or enforce conditions, such as related to the negotiation and/or performance of a contract. A smart contract receives a transaction request and computes predefined conditions of a contract in order to verify that the request meets the criteria. Subsequently, the smart contract may advance through different conditions until all criteria of the contract have been completed and verified. Once the contract is complete, it may be sent to one or more members of a consensus group, such as managers, subject matter experts (SMEs), and/or the like, for final verification (e.g., at which point each respective member may digitally sign the contract using the respective member's digital signature key). Once the consensus group verifies contract is complete, a hash of the transaction is then stored on a block that is added to the blockchain and distributed throughout the network. In some embodiments, the hash of the transaction is also added to one or more data vaults, such as by associating the block that was added to the blockchain with the data vault corresponding to the asset.

In some embodiments, each asset managed on the blockchain is associated with one or more users that are identified as authoritative resources with respect to the asset. An authoritative resource may be, for example, a subject matter expert (SME), manager, owner, or the like. In some embodiments, assets are also associated with permissioned users, which may include authoritative resources as well as other users that have permission to perform various operations with respect to the assets, such as creating new work orders.

In one example, a smart contract manages a maintenance work order for an item of equipment, confirming that the work order is initiated by a permissioned user (or, in some embodiments, by an asset itself, such as using IoT technology) and subsequently verifying that conditions specified in the work order are satisfied before storing a hash of the work order transaction(s) in a block of a blockchain. One or more authoritative resources may verify that the work order has been completed before the hash is stored in the block. Once stored on the blockchain, the transaction may also be included in one or more data vaults, such as a data vault of the asset and data vaults of users associated with the asset.

Furthermore, embodiments of the present disclosure involve automation facilitated by data captured by assets themselves. For example, assets may be equipped with IoT capabilities, and may capture and transmit data for verification and storage on the blockchain. IoT technology allows large amounts of data to be gathered, facilitating the ability to predict failures and react before they occur. As manufacturing techniques advance based on new technologies, IoT capabilities are able to shift focus from preventative maintenance to predictive maintenance while paving the path for integration of machine learning. For example, identifiers and/or bar codes may be used to automatically identify and track tags attached to equipment and shipments in the supply chain. Techniques described herein involve the use of blockchain technology to further advance IoT by maintaining a continuously growing list of cryptographically secured data records captured from assets. In some embodiments, various assets, such as equipment and facilities, may communicate with one another via IoT technology in order to exchange data related to assets. For example, a smart factory may include facilities and equipment that communicate updates to one another related to various lifecycle events for assets, such as when a stage in a manufacturing process is complete for a given asset. IoT data may be exchanged over one or more networks and, in some embodiments, is communicated to a management entity for storage on a blockchain. Blockchain provides valuable security for IoT data, as all data gathered from IoT devices is secured on the blockchain.

Accordingly, by allowing data about assets to be securely and verifiably tracked and managed throughout their lifecycles, techniques described herein improve the utility and security of asset management systems. Furthermore, the use of data vaults that are specific to assets, users, entities, categories, and/or the like organizes data into discrete sets and allows fine-grained access control to be implemented.

It is noted that, while certain embodiments involving the use of a blockchain are described herein, alternative embodiments are possible in which other types of data stores are used. For example, data may related to asset management may be stored in a database, repository, or other type of data store. In some embodiments, rather than storing data in blocks of a blockchain, the data is stored in components of a different type of data store, such as tables or columns of a database or files of a physical or virtual storage system.

Embodiments of the present disclosure overcome various shortcoming in conventional techniques, such as those in which multiple software applications that may be incompatible with one another are used to manage different stages in assets' lifecycles. By providing a unified system that can be accessed by all interested parties and that also receives data directly from assets, techniques described herein improve the functioning and accessibility of asset management systems.

Example Computing Environment for Asset Management

Figure 1:
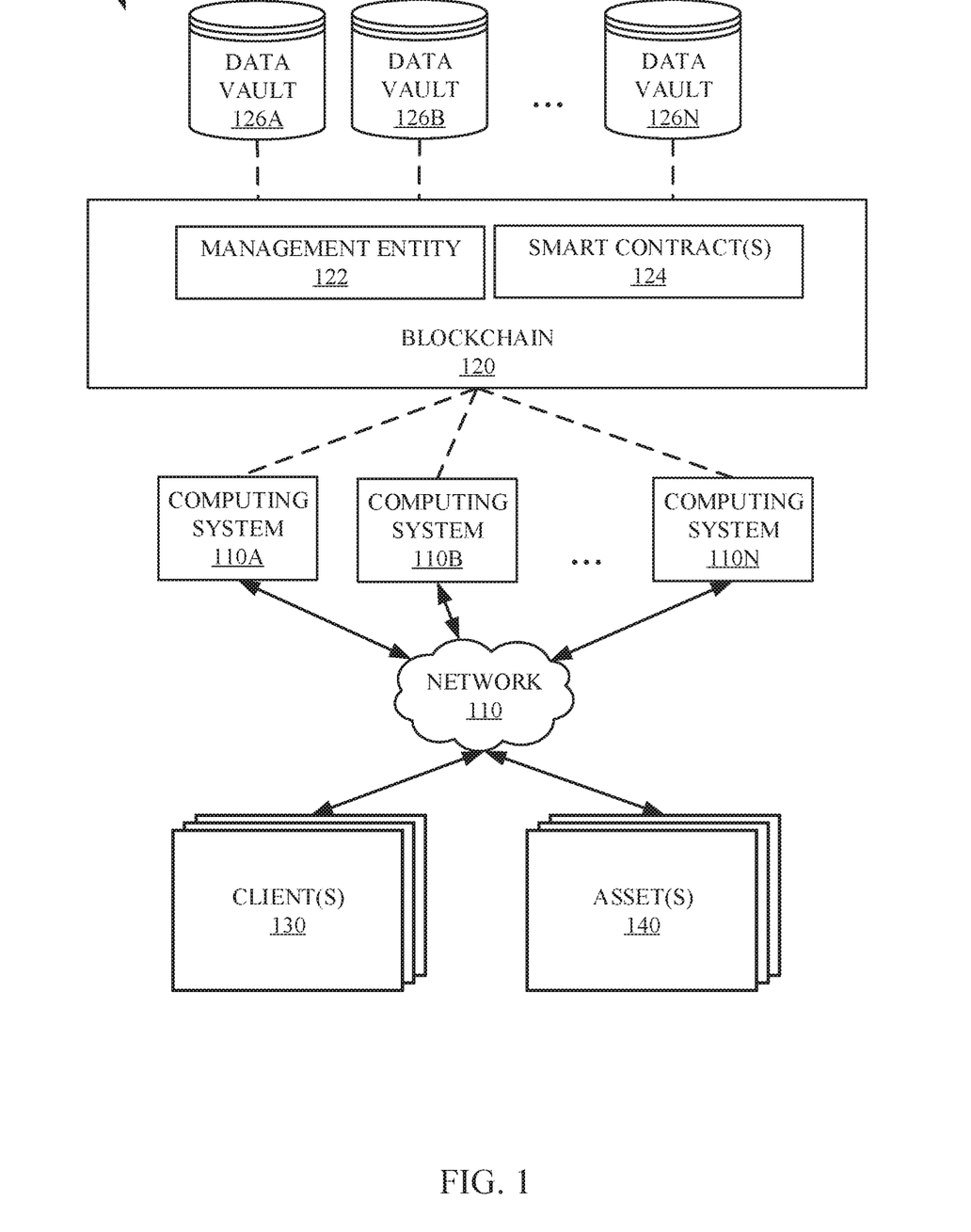
FIG. 1 depicts an example computing environment in which embodiments of the present disclosure may be implemented.

FIG. 1 depicts an example computing environment 100 in which embodiments of the present disclosure may be implemented. FIG. 1 is described in conjunction with FIG. 2, which illustrates an example blockchain, and FIG. 3, which illustrated an example data vault.

Computing environment 100 includes a blockchain 120 that is distributed across a plurality of computing systems 110A-N, as well as one or more clients 130 (e.g., client devices operated by users) and one or more assets 140, all connected via a network 110. Network 110 represents a connection over which data may be transmitted, such as a local area network (LAN), wide area network (WAN), cellular data connection, the Internet, and/or the like.

Computing systems 110A-N represent computing devices, such as server computers, that include processing resources, storage resources, and network connectivity. Blockchain 120 may, for example, be a distributed system comprising a software-defined abstraction that utilizes the physical resources of computing systems 110A-N. In one example, blockchain 120 is a virtual machine.

Figure 2:
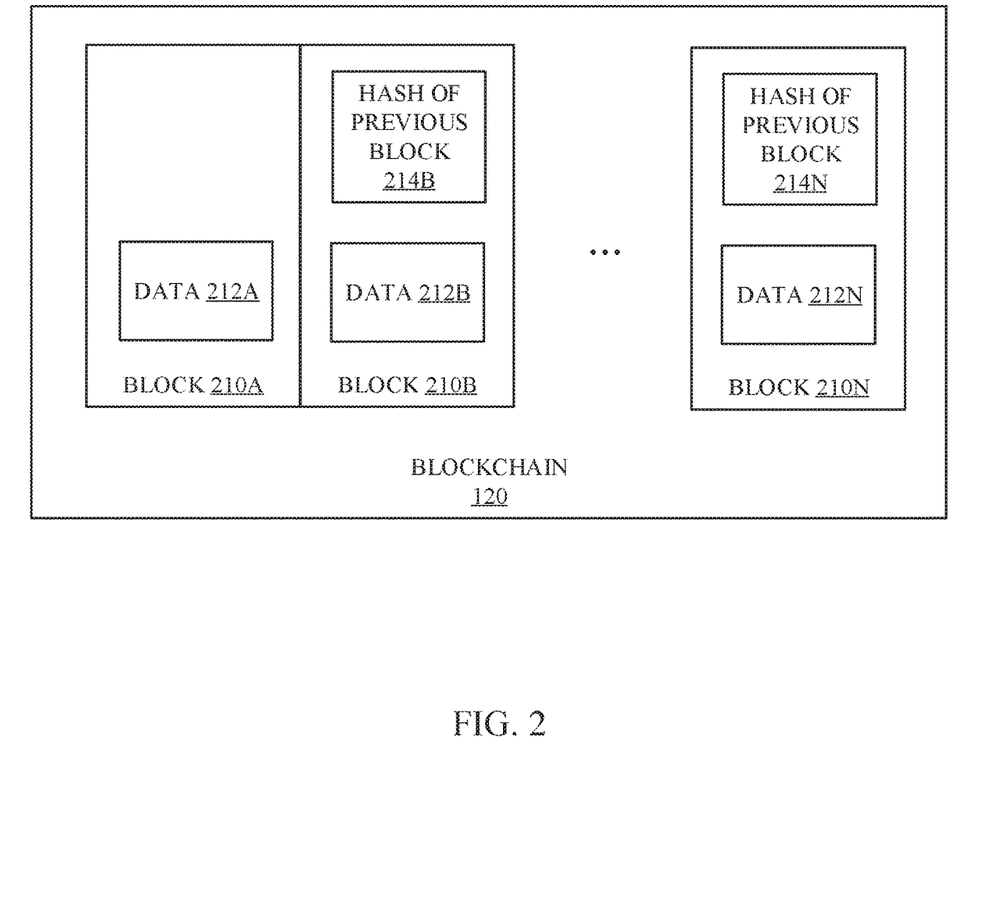
FIG. 2 illustrates an example distributed system for asset management.

For example, as illustrated in FIG. 2, blockchain 120 may comprise a plurality of connected blocks 210A-N. Each block comprises data 212A-N, which may include transaction information, documents, and other data related to assets, supply chains, and users, as well as executable files such as related to management entity 122 and smart contract(s) 124. In some embodiments, data 212A-N comprises hashes of data.

Each of blocks 210B-N comprises a hash 214B-N of a previous block. The blockchain consists of a linked list of blocks interacting like a linked chain. Each block has the hash of the block before it essentially connecting every block together in historical order. As mentioned before, a block is where the hash of each transaction is stored. When a transaction occurs on a blockchain network it goes through a hash function to create the hash that is stored on the block. The data or information that can be hashed representing a transaction includes work orders, purchase requests, drawings, specifications, maintenance criteria, operator and maintenance manuals, financial transactions, personnel information, IoT data, asset commodities, facility information, legal documents, secure documentation (e.g., documents related to government, military, or classified information only to be seen by permissioned viewers), and all documents pertaining to engineering calculations, to name a few examples.

As described in more detail below with respect to FIG. 2, the components of blockchain 120 may be implemented as a series of blocks in a chain. Blockchain 120 comprises management entity 122, which performs operations described herein related to management of data related to assets, and may be located in one or more blocks of the chain. In other embodiments, management entity 122 is implemented separately from blockchain 120, such as on a server that performs management functions for blockchain 120. For example, management entity 122 may receive data from client(s) 130 and/or asset(s) 140, and may verify and store the data in data vaults 126A-N, each of which may comprise one or more blocks of the chain. Management entity 122 may utilize one or more smart contracts 124 in order to track and verify conditions related to the received data. In one example, management entity 122 is also implemented as one or more smart contracts executing on a blockchain. For example, management entity 122 may comprise a smart contract program requesting specified information based on request types and directing/retrieving transactions through computational algorithms. Smart contracts may execute within blocks on the blockchain. In some embodiments, certain data and documents are stored outside the blockchain on a cloud server accessible to permissioned parties. For example, large amounts of sensor data may be captured by assets, and some of the sensor data may not be as critical to the lifecycle of a given asset as other data. In an embodiment, sensor data that does not relate to a fault condition, a maintenance action, or user input, may be stored in a server that is separate from the blockchain, as this data may not need to be accessed as frequently.

Data vaults 126A-N represent data storage entities that correspond to different assets, users, organizations, categories, and/or the like. In some embodiments, each data vault 126 is a software abstraction of storage resources of a subset of computing systems 110A-110N. In certain embodiments, data is stored on a blockchain of blockchain 120 and subsets of the data are referenced by each data vault 126. Data may overlap between data vaults. For example, the same transactions may be included in a data vault for a particular asset and another data vault for a user related to the asset, while the data vault for the user may also include transactions related to other assets. Data vaults allow data to be partitioned into discrete sets that relate to certain assets, users, categories, and the like. As such, permissions can be set with respect to particular data vaults in order to efficiently manage privileges with respect to adding data based on which data vaults pertain to a given user. A particular user may, for example, have privileges to add data to a data vault specific to the particular user, data vaults pertaining to assets related to the user, data vaults pertaining to categories related to the user, and/or the like.

Figure 3:
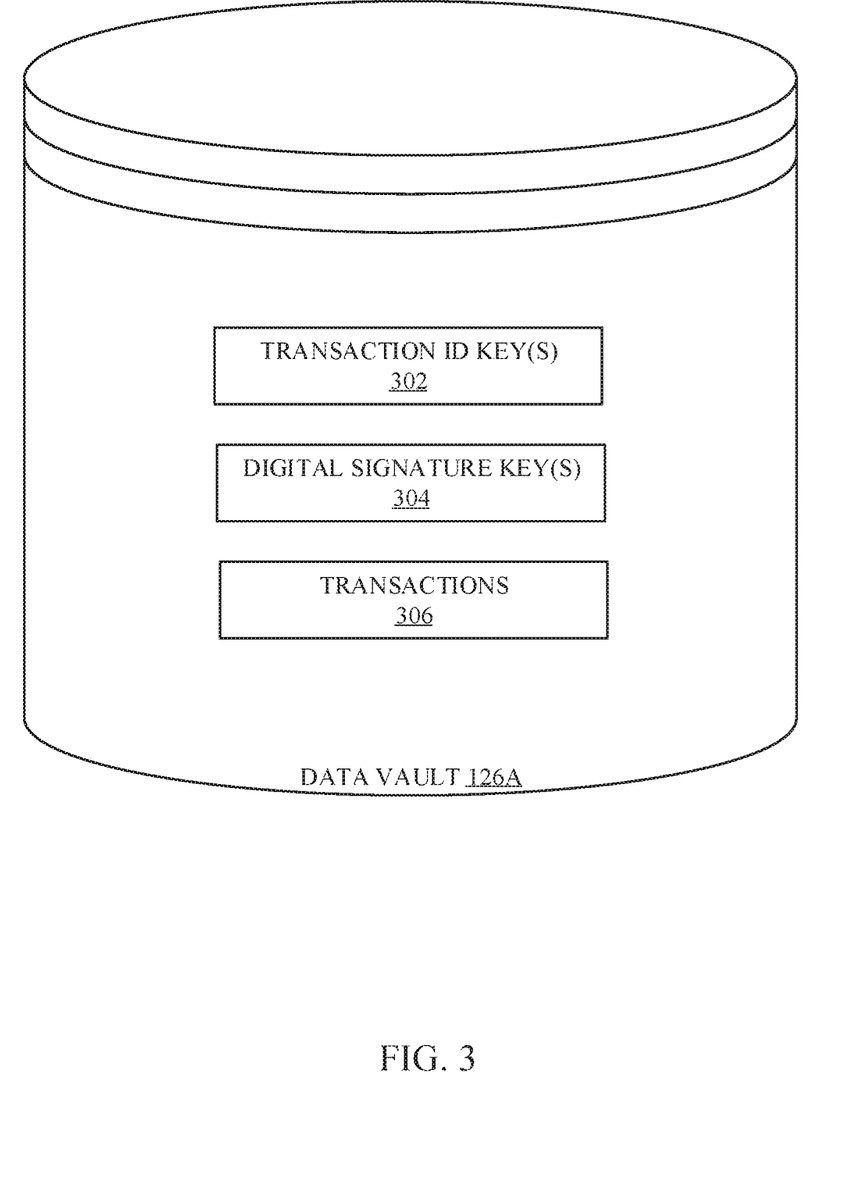
FIG. 3 illustrates an example data vault for asset management.

In some embodiments, each data vault 126 includes one or more transaction ID keys that are used as public keys and one or more digital signature keys that are used as private keys. For example, as shown in FIG. 3, data vault 126A may comprise transaction ID key(s) 302, which are addresses used by clients 130 to direct transactions to data vault 126A for storage on blockchain 120, and digital signature key(s) 304, each of which corresponds to a given user associated with data vault 126A and can be used by the given user to sign or authorize transactions. Data vault 126A further includes transactions 306, which represent data related to lifecycle events of assets, such as maintenance work orders and other types of data that have been completed and approved by an authorized user (e.g., a SME with respect to an asset to which data vault 126A corresponds, a manager, and/or the like).

In one example, data vault 126A corresponds to a particular asset, data vault 126B corresponds to a particular user, and data vault 126N corresponds to a particular category, such as assembly line equipment, and includes data related to all assets that fall within the particular category. Users may have different levels of permissions with respect to different data vaults 126, such as the ability to read, write, and/or approve data related to certain data vaults 126. Permissions may be maintained and enforced by management entity 122 and/or based on digital signature keys such as digital signature key(s) 304.

Blockchain 120 provides an end-to-end asset and supply chain management system that tracks and maintains data related to assets throughout their lifecycles in a secure and verifiable manner. For example, a client 130 may submit a request to add a new asset 140 to blockchain 120, such as to add an item of manufacturing equipment to a particular data vault 126. The client 130 may include a digital signature key of a user of the client 130 in the request, and management entity 122 may confirm that the user is authorized to add the new asset 140 based on the user's digital signature key. In an example, management entity 122 determines that the digital signature key included in the request corresponds to a data vault 126 that relates to the category of manufacturing equipment, indicating that the user is a manager or SME related to manufacturing equipment and is authorized to add new manufacturing equipment assets to blockchain 120.

In some embodiments, management entity 122 also requests approval from one or more other users for adding the new asset 140, either on its own or by executing a smart contract 124. For example, if there is a user assigned as a primary SME for manufacturing equipment, management entity 122 may send a request to that user for approval to add the new asset 140. Upon receiving approval from the one or more other users, such as including digital signature keys, management entity 122 adds the new asset 140 to the system. In an example, management entity 122 creates a new data vault 126 for the asset. In some embodiments, management entity 122 requests additional information related to the new asset 140 from the user of the client 130 and/or the one or more other users. For example, management entity 122 may send a pre-defined template for the specific asset type that includes a request for standardized information that would be entered by an asset SME. The template may consist of a request for asset naming conventions (e.g., the standardized way of entering the name of new assets), asset maintenance modules (e.g., maintenance tasks or checks), asset standards and requirements, asset location, and all asset drawings, calculations, certifications, and commissioning documents. Once management entity 122 receives all information specified in the template and, in some embodiments, after receiving approval of the information from one or more other users, management entity 122 stores all of the received information related to the new asset as one or more transactions in one or more blocks 210A-N (e.g., in a new block appended to the chain). The one or more transactions added to the one or more blocks 210A-N are included in a data vault 126 for the new asset 140 and, in some embodiments, in other data vaults 126 corresponding to users, organizations, categories, and/or the like.

Once the new asset 140 is added to blockchain 120, various lifecycle events related to the new asset 140 are managed by management entity 122. For example, the new asset 140 may be manufactured by a third party, and various transactions may be received from clients 130 related to the manufacturing process. The third party may be given a certain level of access with respect to a data vault for the asset, and may submit transactions related to completing different manufacturing stages from a client 130, and the transactions may be approved by other users and may be stored in new blocks 210 and referenced in one or more data vaults 126. In some embodiments, financial transactions related to the asset are also managed and maintained in blockchain 120. For instance, management entity 122 may initiate execution of a smart contract 124 executing on one or more blocks 210 to govern purchase of the new asset 140, and the smart contract 124 may request and confirm contractual details regarding the purchase of the asset (e.g., dates, prices, shipment details, and the like). For example, the smart contract 124 may request confirmation of shipment from the third party, confirm shipment with a postal carrier, request confirmation that the shipment was received, confirm validity of the shipment, confirm that deadlines are met, initiate payment, and store each of these transactions in blocks 210 (in some embodiments after receiving approval along with digital signature keys from one or more particular users) In some embodiments, each time a client 130 sends transaction information to blockchain 130, such as to confirm shipment, the client 130 includes the transaction ID key associated with the asset 140, which is used by management entity 122 to identify data vaults 126 to which the transaction information corresponds.

Furthermore, maintenance of the asset 140 may be tracked by management entity 122. In an example, IoT data from the asset 140, such as sensor data, timer data, counter data such as cycle counter data, or the like may indicate that maintenance is due. In another example a client 130 may send a work order for maintenance on asset 140 to management entity 122. Upon confirming based on one or more digital signatures from users that a maintenance action is approved, management entity 122 initiates one or more smart contracts 124 to guide the maintenance action. For example, a smart contract 124 executed by management entity 122 may track who is assigned as a maintenance professional, when maintenance is performed, whether IoT data from the asset 140 indicates that the maintenance was successfully completed, whether one or more users sign off on the completed maintenance, and/or the like, storing transactions related to the maintenance action in one or more blocks 210 as appropriate. One or more users may be able to charge time to a given work order, meaning that multiple users may be able to work on the given work order, but there may be only one user assigned as the authorized user to close out the given work order. In some embodiments, smart contracts 124 are given permission to access data, such as in data vaults 126, by management entity 122.

In one example, a user sends a request to management entity 122 from a client 130 to manage a new piece of airplane manufacturing equipment for use in a particular factory. Management entity 122 verifies that the user has permissions to add data pertaining to a type of the piece of airplane manufacturing equipment to blockchain 120 and that the piece of airplane manufacturing equipment pertains to the particular factory. For example, permissions for users with respect to asset types and associations between asset types and factories may be defined by an administrator and stored on blockchain 120. In some embodiments, if the type of the piece of airplane manufacturing equipment does not have any permission data associated with it, such as if the type has not previously been managed on blockchain 120, an administrator or other authoritative user may be prompted to approve the management of the new piece of airplane manufacturing equipment. In some embodiments, management entity 122 creates a new data vault 126 for the piece of airplane manufacturing equipment. Management entity 122 then requests descriptive data related to the piece of airplane manufacturing equipment, such as drawings, specifications, estimates and/or the like from the user and/or another user determined to be an authoritative resource for the piece of manufacturing equipment. Upon receiving the descriptive data, management entity 122 stores hashes of the descriptive data in blocks of blockchain 120 and adds the blocks (e.g., pointers of the blocks) to the data vault 126 for the piece of airplane manufacturing equipment as well as a data vault for the user and a data vault for the particular factory. Subsequently, various life-cycle events of the piece of airplane manufacturing equipment are tracked and managed on blockchain 120 as described herein.

Additionally, supply chains of products may be tracked and managed by blockchain 120. For example, a maintenance action may require the purchase of parts. For example, a purchase order for a part may be initiated by a user or automatically by a smart contract 124 (e.g., based on IoT data indicating that the part is needed). As such, a supply chain for the part may be initiated by management entity 122, which may request approval of the purchase order from one or more users, receive payment information, track shipment of the part, and/or the like.

Supply chain management may be facilitated by identifiers and/or barcodes associated with parts and other assets, which may be scanned by clients 130 in order to relay information to management entity 122. Some assets may be equipped with various IoT features that allow various attributes to be automatically tracked, such as when manufacturing and maintenance events were completed, sensor readings, battery life, and the like. Each time barcode data or other IoT data is received by management entity 122 for an asset 140, this data may be written to the blockchain, thereby establishing trust and accountability for all parties within the process.

Information related to facilities may also be managed in blockchain 120. For example, a secure facility may be an asset 140, and various information about the secure facility may be tracked and maintained. For instance, information regarding entries and exits to and from the secure facility, such as based on badge data or information from other security systems, may be received by management entity 122 and stored in a data vault 126 associated with the secure facility. Furthermore, conditions of a building may be monitored through user input as well as sensor and other IoT data (e.g., data from security systems associated with facilities, such as badge readers, cameras, and smoke detectors) in order to determine when maintenance is needed on the building, and maintenance actions for the building may subsequently be managed by management entity 122.

Clients 130 may include various types of computing devices, such as laptop and desktop computers, tablet computers, mobile devices, IoT devices, and/or the like. In some embodiments, users of clients 130 interact with blockchain 120 through an application that provides a user interface. In an example, each given user is assigned a given data vault 126 that is specific to the given user, and the user is able to access all information in the given data vault 126 through the user interface, as well as request to read and write data with respect to various other data vaults 126 for which the given user has various permissions. Many types of user interfaces may be employed with techniques described herein.

While certain examples are described herein including manufacturing equipment, parts, maintenance actions, facilities, and the like, techniques described herein may be employed to manage other types of assets and processes as well. For example, personnel data, legal actions, computer equipment and networks, inventory, product sales, and/or the like may also be managed using embodiments of the present disclosure.

Example Operations for Asset and Supply Chain Management

Figure 4:
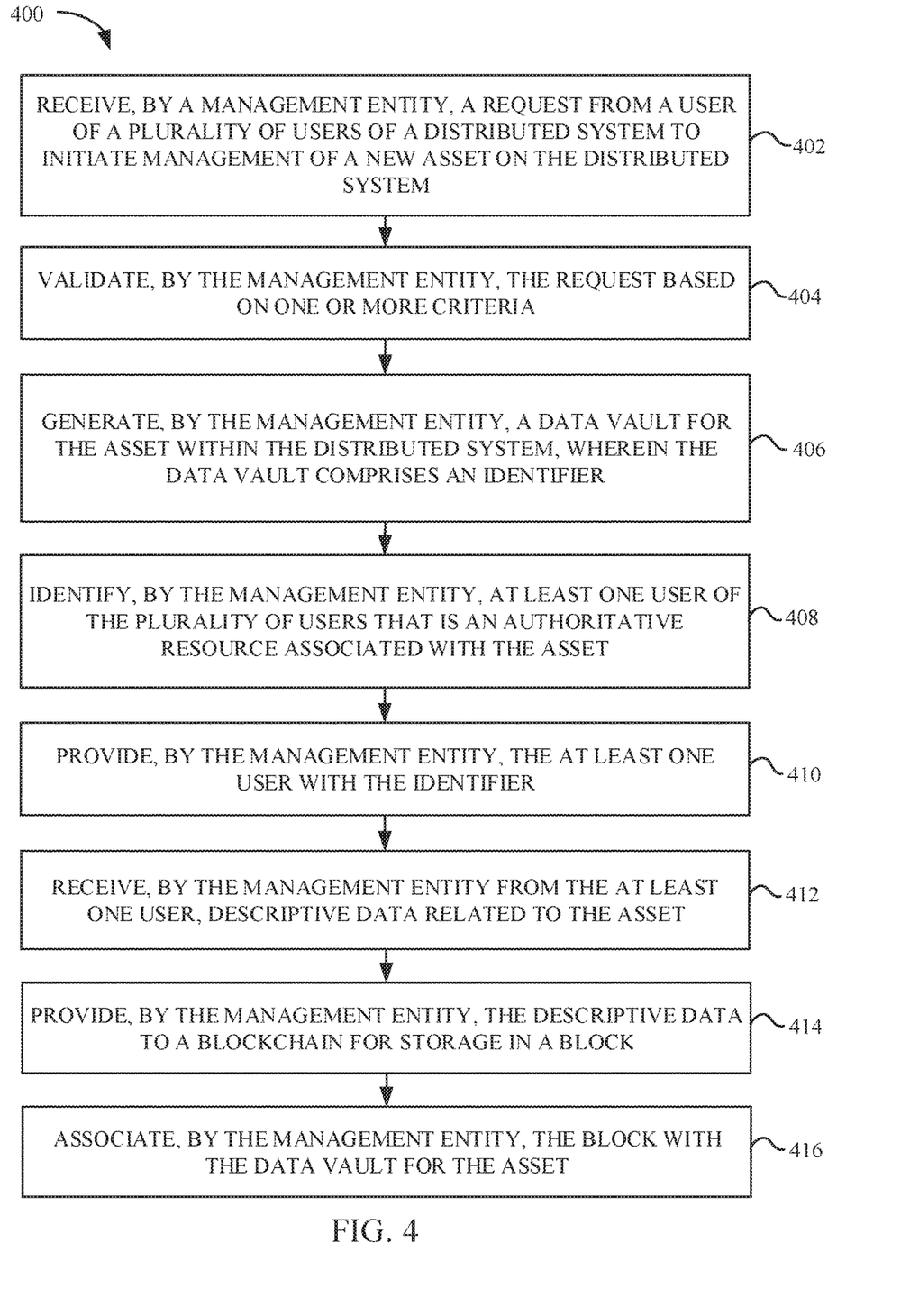
FIG. 4 illustrates example operations for asset management.

FIG. 4 illustrates example operations 400 for asset and supply chain management. In some implementations, operations 400 are performed by management entity 122 of FIG. 1.

At 402, a management entity receives a request from a user of a plurality of users of a blockchain to initiate management of a new asset on the blockchain. For example, management entity 122 of FIG. 1 may receive the request from a client 130 of FIG. 1, initiated by a user, to add a new asset 140 to blockchain 120.

At 404, the management entity validates the request based on one or more criteria. In an example, management entity 122 of FIG. 1 validates the request based on one or more of: a characteristic of the user; funding related to the asset; or a type of the asset. In one example, management entity 122 of FIG. 1 confirms that the user is authorized to initiate management of the new asset based on a user identifier and/or digital signature key included in the request. In certain embodiments, management entity 122 of FIG. 1 confirms that funding for the asset is available and/or authorized by one or more responsible users. In some examples, management entity 122 of FIG. 1 confirms that the asset is of an appropriate type, such as whether the asset is of a type that the user is authorized to manage, for which funding is authorized, and/or the like. In one example, management entity 122 confirms that a given item of equipment belongs in a given factory and that the user has authority to initiate purchase of the item of equipment.

At 406, the management entity generates a data vault for the asset, wherein the data vault an identifier. In an example, management entity 122 of FIG. 1 creates a data vault 126 of FIG. 1 that is specific to the asset 140 of FIG. 1, and the data vault 126 comprises references to one or more of blocks 210 of FIG. 2 that store transactions related to the asset 140, and includes one or more transaction ID keys 302 and/or digital signature keys 304 of FIG. 3. The identifier (e.g., transaction ID key) may be an address associated with the data vault. In alternative embodiments, the data vault is not created until transaction data is received for storage in the data vault.

At 408, the management entity identifies at least one user of the plurality of users that is an authoritative resource, such as a subject matter expert (SME) or owner, associated with the asset. In an example, management entity 122 of FIG. 1 determines that the user who submitted the request is an authoritative resource with respect to the asset 140 of FIG. 1, while in other embodiments management entity 122 of FIG. 1 determines that a different user is an authoritative resource with respect to the asset. Users that are authoritative resources with respect to assets may be determined based on information stored in various data vaults, such as a data vault that corresponds to a type of the asset (e.g., a data vault associated with the type of the asset may indicate one or more users that are authoritative resources for all assets of the type).

At 410, the management entity provides the at least one user with the identifier. In an example, management entity 122 of FIG. 1 sends the at least one user a request for additional information related to the asset, including the identifier in the request. The request may be based on a template corresponding to a type of the asset (e.g., the template defining the types of information that are to be requested for all assets of the type), and may include a request for various types of information relevant to the asset. For example, the additional information may include asset naming conventions, asset maintenance modules, asset standards and requirements, asset location, asset drawings, calculations, certifications, and/or commissioning documents.

At 412, the management entity receives descriptive data related to the asset from the at least one user. For example, the at least one other user may receive the request sent at 410 via a client 140 of FIG. 1, and may provide the descriptive data via the client 130 of FIG. 1 in response to the request. The client 130 of FIG. 1 may then send the descriptive data to management entity 122 of FIG. 1.

At 414, the management entity provides the descriptive data to a blockchain for storage in a block. For example, a hash of the descriptive data may be generated by code on blockchain 120, of FIG. 1 and the hash of the descriptive data may be stored in a new block 210 of FIG. 2 appended to the end of blockchain 120 of FIG. 1, and the new block 210 of FIG. 1 is included in the data vault 126 of FIG. 1 corresponding to the asset 140 if FIG. 1. If the new block 210 of FIG. 2 is not the first block on the chain, it will also include a hash of the previous block on the chain.

At 416, the management entity associates the block with the data vault for the asset. For example, management entity 122 may add a reference to the new block 210 of FIG. 2 to the data vault 126 of FIG. 1 corresponding to the asset 140 of FIG. 1.

Some embodiments include receiving, by the management entity, a notification of a lifecycle event related to the asset, wherein the notification comprises the identifier. The lifecycle event may comprise one or more of: a manufacturing event; a maintenance event; or a supply chain event. Certain embodiments include generating, by the management entity, an entry in the data vault based on the notification (e.g., a transaction related to the data vault may be stored in a block on the blockchain and referenced by the data vault). For example, management entity 122 of FIG. 1 may store a transaction related to the lifecycle event in a new block 210 of FIG. 2 that is included in (e.g., referenced by) the data vault. In some embodiments, management entity 122 of FIG. 1 initiates one or more smart contracts related to the lifecycle event.

In certain embodiments, the notification of the lifecycle event related to the asset comprises sensor data received from the asset.

Additional embodiments include receiving, by the management entity, a work order request from a given user of the plurality of users that is related to the asset. Embodiments include validating the work order request based on one or more of: whether the given user has permission to initiate the work order; whether funding for the work order is approved; or whether the work order complies with a regulation related to the asset. Some embodiments include notifying, by the management entity, the at least one user of the work order. For example, an authoritative resource for the asset may be notified of the work order and approval may be requested from the authoritative resource. In some embodiments, the given user and/or the at least one user provide digital signature keys to management entity 122 of FIG. 1.

Additional embodiments include initiating, by the management entity, a smart contract on the blockchain to manage a lifecycle of the work order. In an example, management entity 122 of FIG. 1 initiates execution of a smart contract 124 of FIG. 1 on blockchain 120 of FIG. 1 to request and verify information related to one or more stages of the lifecycle of the asset.

In some embodiments, the smart contract is configured to receive updates related to the work order and confirm that the work order is completed.

Further embodiments include receiving, by the management entity, a digital signature from the at least one user; verifying, by the management entity, the digital signature; closing, by the management entity, the work order in response to the verifying; and generating, by the management entity, an entry in the data vault based on the work order.

In some embodiments, the asset comprises an item of equipment, an individual, an organization, a manufacturer, or a facility. For example, the asset may by an item of manufacturing equipment, a part, a secure facility, and employee, a business, and/or the like. The asset may be equipped with one or more sensors that gather and send data to management entity 122 of FIG. 1. Not all data received by management entity 122 of FIG. 1 is stored on a blockchain. For example, not all IoT data needs to be transacted on the blockchain due to the large quantities of data being communicated for each piece of equipment. This could cause enormous traffic on network 110 of FIG. 1 and slow down transaction speeds on the blockchain. This would also require a massive amount of storage. Thus, transactions recorded to the blockchain based on IoT data may be limited to equipment failures, faults, human initiated parameter changes, shutdowns, and warning signals, as well as certain communications from equipment to equipment and from equipment to facility. These transactions may not be in the form of work orders but, rather, in the form of notification transactions recorded on the blockchain and added to the asset's history in its data vault. In some embodiments, all other IoT data may be stored outside the blockchain, such as in a data storage device associated with the asset.

All data stored in blockchain may be accessible to all or a permissioned subset of users. As such, transactions related to an asset may be reviewed, tracked, audited, and verified by all concerned parties. Accordingly, techniques described herein promote trust, security, and accountability in asset and supply chain management.

Example Processing System for Asset and Supply Chain Management

Figure 5:
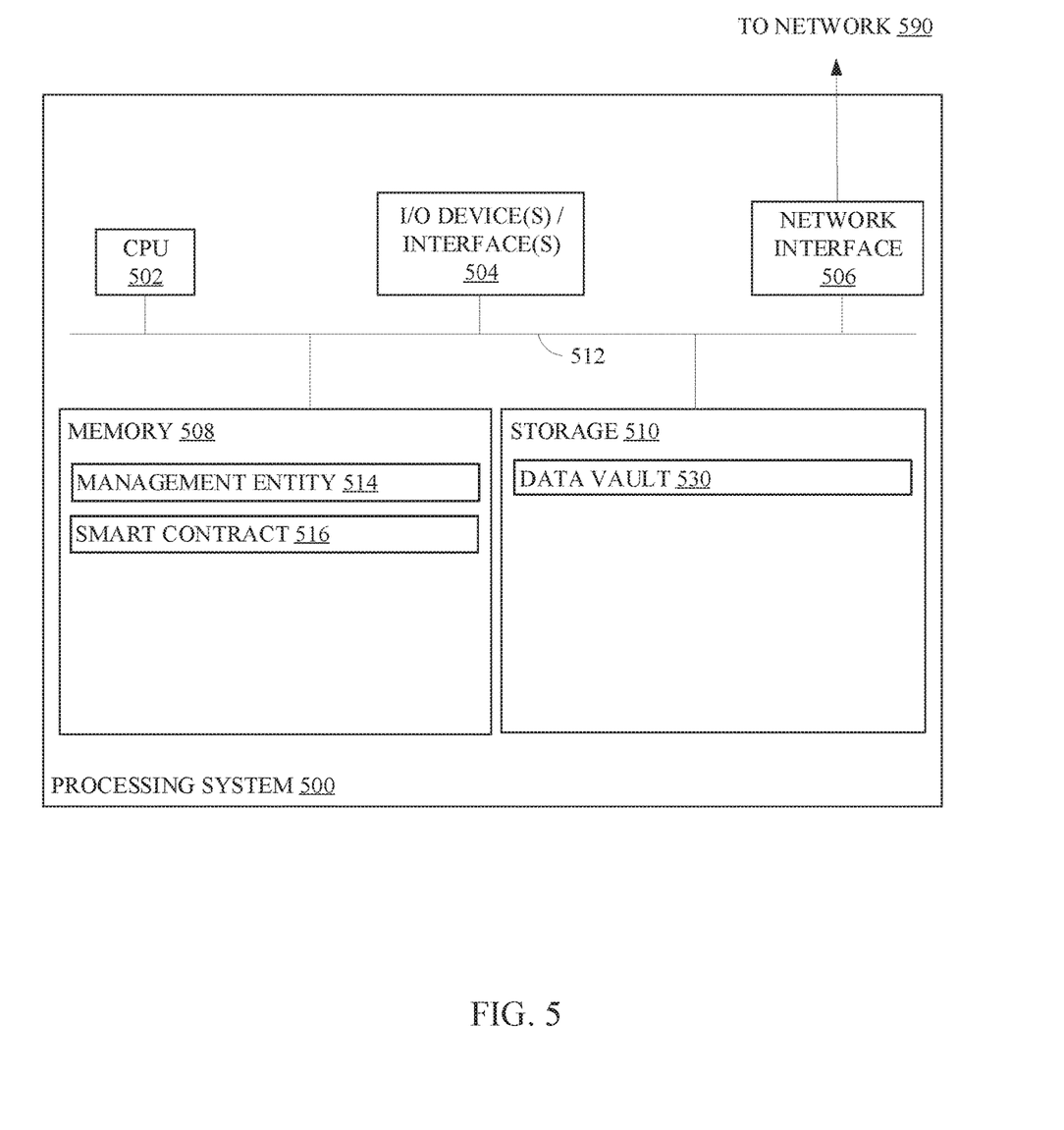
FIG. 5 illustrates an example processing system with which embodiments of the present disclosure may be implemented.

FIG. 5 depicts a processing system 500 that may be used to perform methods described herein, such as the operations 400 for asset and supply chain management described above with respect to FIG. 4. In certain embodiments, processing system 500 is representative of one or more of computing systems 110A-N of FIG. 1. In other embodiments, certain components of processing system 500 are representative of one or more of clients 130. For example, all components of processing system 500 other than the contents of memory 508 and storage 510 may be representative of components of clients 130.

Processing system 500 includes a CPU 502 connected to a data bus 512. CPU 502 is configured to process computer-executable instructions, e.g., stored in memory 508 or storage 510, and to cause processing system 500 to perform methods as described herein, for example with respect to FIG. 4. Though depicted as only including only one CPU 502, processing system 500 may have more than one processor.

Processing system 500 further includes input/output device(s) and interface(s) 504, which allows processing system 500 to interface with input/output devices, such as, for example, keyboards, displays, mouse devices, pen input, and other devices that allow for interaction with processing system 500. Note that while not depicted with independent external I/O devices, processing system 500 may connect with external I/O devices through physical and wireless connections (e.g., an external display device).

Processing system 500 further includes network interface 506, which provides processing system 500 with access to external networks, such as network 590, and thereby external computing devices.

Processing system 500 further includes memory 508, which in this example includes management entity 514 and smart contract 516, which may correspond to management entity 122 and a smart contract 124 of FIG. 1, and may perform operations described above with respect FIG. 4. In one example, management entity 514 manages information related to one or more assets 140 of FIG. 1, including information received from clients 130 of FIG. 1, storing data as transactions in blocks 210 of FIG. 2, and generating data vaults 126 of FIG. 1 (e.g., including data vault 530) for storing data related to particular assets, users, organizations, categories, and/or the like.

Note that while shown as a single memory 508 in FIG. 5 for simplicity, the aspects stored in memory 508 may be stored in different physical memories, but all accessible to CPU 502 via data connections, such as bus 512.

Processing system 500 further includes storage 510, which in this example includes data vault 530, which represents a data vault 126 of FIG. 1. Data vault 530 stores transaction data, transaction ID keys, digital signature keys, and/or the like. The aspects depicted in storage 510 may, in some embodiments, be distributed across a plurality of systems.

While not depicted in FIG. 5, other aspects may be included in storage 510.

As with memory 508, a single storage 510 is depicted in FIG. 5 for simplicity, but the various aspects stored in storage 510 may be stored in different physical storages, but all accessible to CPU 502 via internal data connections, such as bus 512, I/O interfaces 505, or external connection, such as network interface 506.

As processing system 500 is representative of one node in a blockchain, such as one of computing systems 110 of FIG. 1, it is noted that various components depicted in processing system 500 may be distributed across a plurality of processing systems. For example, aspects of management entity 514 may run on a single processing system 500 or on a plurality of processing systems.

Example Embodiments

The following are example embodiments. Notably, the reference numerals in the examples below are merely examples. Further, even if single claim dependencies are indicated in the following examples, or in the claims below, all claim dependencies, including multiple claim dependencies, are included within the scope of the present disclosure.

Embodiment 1: A method for asset management, comprising: receiving, by a management entity (122), a request from a user of a plurality of users (130) of a distributed system (120) to initiate management of a new asset (140) on the distributed system (402); validating, by the management entity (122), the request based on one or more of: a characteristic of the user; a location of the asset; funding related to the asset; or a type of the asset (404); generating, by the management entity (122), a data vault (126) for the asset within the distributed system, wherein the data vault comprises an identifier (406, 302, 304); identifying, by the management entity (122), at least one user of the plurality of users that is an authoritative resource associated with the asset (408); providing, by the management entity (122), the at least one user with the identifier (410); receiving, by the management entity (122) from the at least one user, descriptive data related to the asset (412); providing, by the management entity (122), the descriptive data to a blockchain for storage in a block (414); and associating, by the management entity (122), the block with the data vault for the asset (416).

Embodiment 2: The method of Embodiment 1, further comprising receiving, by the management entity (122), a notification of a lifecycle event related to the asset (140), wherein the notification comprises the identifier (302, 304), and wherein the lifecycle event comprises one or more of: a manufacturing event; a maintenance event; or a supply chain event; and generating, by the management entity (122), an entry (306) in the data vault (126) based on the notification.

Embodiment 3: The method of Embodiment 2, wherein the notification of the lifecycle event related to the asset comprises sensor data received from the asset (140).

Embodiment 4: The method of Embodiment 1, wherein the management entity (122) notifies a subset of the plurality of users (130) of the entry (306) in the data vault (126), wherein the subset of the plurality of users are permissioned users for the data vault (126).

Embodiment 5: The method of Embodiment 1, further comprising: receiving, by the management entity (122), a work order request from a given user of the plurality of users (130) that is related to the asset (140); validating the work order request based on one or more of: whether the given user has permission to initiate the work order; whether funding for the work order is approved; or whether the work order complies with a regulation related to the asset (404); and notifying, by the management entity (122), the at least one user (130) of the work order.

Embodiment 6: The method of Embodiment 5, further comprising initiating, by the management entity (122), a smart contract on the distributed system to manage a lifecycle of the work order (124).

Embodiment 7: The method of Embodiment 6, wherein the smart contract is configured to: receive updates related to the work order from a subset of the plurality of users that are permissioned users with respect to the asset; and confirm that the work order is completed (124).

Embodiment 8: The method of Embodiment 7, further comprising: receiving, by the management entity (122), a digital signature from the at least one user (130); verifying, by the management entity (122), the digital signature; closing, by the management entity (122), the work order in response to the verifying; generating, by the management entity (122), an entry (306) in the data vault (126) based on the work order; and notifying, by the management entity (122), the subset of the plurality of users of the entry in the data vault (126).

Embodiment 9: The method of Embodiment 1, wherein the asset comprises one of: an item of equipment; a facility; an individual; or an organization (140).

Embodiment 10: A system (500) comprising a processor (502) and a non-transitory computer-readable medium (508) comprising instructions that, when executed by the processor, cause the processor to perform methods of Embodiments 1-9.

Embodiment 11: A non-transitory computer-readable medium (508) comprising instructions that, when executed by a processor (502), cause the processor to perform methods of Embodiments 1-9.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for asset management, comprising:
    receiving, by a management entity, a request from a user of a distributed system to initiate management of an asset on the distributed system, wherein the request comprises a digital signature key;
    validating, by the management entity, the request based on comparing the digital signature key to one or more digital signature keys in a given data vault associated with a type of the asset;
    generating, by the management entity, based on the validating, a data vault for the asset within the distributed system, wherein the data vault comprises at least an identifier;
    identifying, by the management entity, at least one user that is an authoritative resource associated with the asset based on information in the given data vault associated with the type of the asset;
    providing, by the management entity, the at least one user with the identifier;
    receiving, by the management entity from the at least one user, descriptive data related to the asset;
    providing, by the management entity, the descriptive data to a modification-resistant distributed ledger for storage in a data store component; and
    associating, by the management entity, the data store component with the data vault for the asset.

2. The computer-implemented method of claim 1, further comprising:
    receiving, by the management entity, a notification of a lifecycle event related to the asset, wherein the notification comprises the identifier, and wherein the lifecycle event comprises one or more of:
        a manufacturing event;
        a maintenance event; or
        a supply chain event; and
    generating, by the management entity, an entry in the data vault based on the notification.

3. The computer-implemented method of claim 2, wherein the notification of the lifecycle event related to the asset comprises sensor data received from the asset.

4. The computer-implemented method of claim 1, wherein the management entity notifies a set of users based on associating the data store component with the data vault for the asset, wherein the set of users are permissioned users for the data vault.

5. The computer-implemented method of claim 1, further comprising:
    receiving, by the management entity, a work order request from a given user that is related to the asset;
    validating the work order request based on one or more of:
        whether the given user has permission to initiate a work order corresponding to the work order request;
        whether funding for the work order is approved; or
        whether the work order complies with a regulation related to the asset; and
    notifying, by the management entity, the at least one user of the work order.

6. The computer-implemented method of claim 5, further comprising initiating, by the management entity, a smart contract on the distributed system to manage a lifecycle of the work order.

7. The computer-implemented method of claim 6, wherein the smart contract is configured to:
    receive updates related to the work order from a set of users that are permissioned users with respect to the asset; and
    confirm that the work order is completed.

8. The computer-implemented method of claim 7, further comprising:
    receiving, by the management entity, a given digital signature key from the at least one user;
    verifying, by the management entity, the given digital signature key;
    closing, by the management entity, the work order in response to the verifying;

generating, by the management entity, an entry in the data vault based on the work order; and notifying, by the management entity, the set of users of the entry in the data vault.

9. The computer-implemented method of claim 1, wherein the asset comprises one of: an item of equipment; a facility; an individual; or an organization.

10. A system comprising one or more processors and a non-transitory computer-readable medium comprising instructions that, when executed by the one or more processors, cause the system to perform a method for asset management, the method comprising:

receiving, by a management entity, a request from a user of a distributed system to initiate management of an asset on the distributed system, wherein the request comprises a digital signature key;

validating, by the management entity, the request based on comparing the digital signature key to one or more digital signature keys in a given data vault associated with a type of the asset;

generating, by the management entity, based on the validating, a data vault for the asset within the distributed system, wherein the data vault comprises at least an identifier;

identifying, by the management entity, at least one user that is an authoritative resource associated with the asset based on information in the given data vault associated with the type of the asset;

providing, by the management entity, the at least one user with the identifier;

receiving, by the management entity from the at least one user, descriptive data related to the asset;

providing, by the management entity, the descriptive data to a modification-resistant distributed ledger for storage in a data store component; and associating, by the management entity, the data store component with the data vault for the asset.

11. The system of claim 10, wherein the method further comprises:

receiving, by the management entity, a notification of a lifecycle event related to the asset, wherein the notification comprises the identifier, and wherein the lifecycle event comprises one or more of:
a manufacturing event;
a maintenance event; or
a supply chain event; and generating, by the management entity, an entry in the data vault based on the notification.

12. The system of claim 11, wherein the notification of the lifecycle event related to the asset comprises sensor data received from the asset.

13. The system of claim 10, wherein the management entity notifies a set based on associating the data store component with the data vault for the asset, wherein the set of users are permissioned users for the data vault.

14. The system of claim 10, wherein the method further comprises:

receiving, by the management entity, a work order request from a given user that is related to the asset;

validating the work order request based on one or more of:
whether the given user has permission to initiate a work order corresponding to the work order request;
whether funding for the work order is approved; or
whether the work order complies with a regulation related to the asset; and notifying, by the management entity, the at least one user of the work order.

15. The system of claim 14, wherein the method further comprises initiating, by the management entity, a smart contract on the distributed system to manage a lifecycle of the work order.

16. The system of claim 15, wherein the smart contract is configured to:

receive updates related to the work order from a set of users that are permissioned users with respect to the asset; and confirm that the work order is completed.

17. The system of claim 16, wherein the method further comprises:

receiving, by the management entity, a given digital signature key from the at least one user;

verifying, by the management entity, the given digital signature key;

closing, by the management entity, the work order in response to the verifying;

generating, by the management entity, an entry in the data vault based on the work order; and notifying, by the management entity, the set of users of the entry in the data vault.

18. The system of claim 10, wherein the asset comprises one of: an item of equipment; a facility; an individual; or an organization.

19. A non-transitory computer-readable medium comprising instructions that, when executed by a processor, cause the processor to perform a method for asset management, the method comprising:

receiving, by a management entity, a request from a user of a distributed system to initiate management of an asset on the distributed system, wherein the request comprises a digital signature key;

validating, by the management entity, the request based on comparing the digital signature key to one or more digital signature keys in a given data vault associated with a type of the asset;

generating, by the management entity, based on the validating, a data vault for the asset within the distributed system, wherein the data vault comprises at least an identifier;

identifying, by the management entity, at least one user that is an authoritative resource associated with the asset based on information in the given data vault associated with the type of the asset;

providing, by the management entity, the at least one user with the identifier;

receiving, by the management entity from the at least one user, descriptive data related to the asset;

providing, by the management entity, the descriptive data to a modification-resistant distributed ledger for storage in a data store component; and associating, by the management entity, the data store component with the data vault for the asset.

20. The non-transitory computer-readable medium of claim 19, wherein the method further comprises:

receiving, by the management entity, a notification of a lifecycle event related to the asset, wherein the notification comprises the identifier, and wherein the lifecycle event comprises one or more of:
a manufacturing event;
a maintenance event; or
a supply chain event; and generating, by the management entity, an entry in the data vault based on the notification.

* * * * *

UNITED STATES PATENT AND TRADEMARK OFFICE
CERTIFICATE OF CORRECTION

| | | |
|---|---|---|
| PATENT NO. | : 11,210,640 B2 | |
| APPLICATION NO. | : 16/720828 | |
| DATED | : December 28, 2021 | |
| INVENTOR(S) | : Casey C. Krueger | |

It is certified that error appears in the above-identified patent and that said Letters Patent is hereby corrected as shown below:

In the Claims

In Column 17, Line 53, in Claim 13, after "set" insert -- of users --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*